(12) United States Patent

Njah

(10) Patent No.: US 12,565,339 B2

(45) Date of Patent: Mar. 3, 2026

(54) NON-TUBULAR ROCKET STAGE LANDING APPARATUS

(71) Applicant: Mounir Njah, Blaine, MN (US)

(72) Inventor: Mounir Njah, Blaine, MN (US)

( * ) Notice: Subject to any disclaimer, the term of this patent is extended or adjusted under 35 U.S.C. 154(b) by 0 days.

(21) Appl. No.: 18/772,174

(22) Filed: Jul. 14, 2024

(65) Prior Publication Data

US 2026/0015105 A1 Jan. 15, 2026

(51) Int. Cl.
B64G 1/62 (2006.01)

(52) U.S. Cl.
CPC ............. B64G 1/625 (2023.08); B64G 1/623 (2023.08)

(58) Field of Classification Search
CPC ............. B64G 1/62; B64G 1/625; B64D 5/00
See application file for complete search history.

(56) References Cited

U.S. PATENT DOCUMENTS 3,181,821 A * 5/1965 Webb ...................... F16F 7/125
188/371
3,191,316 A * 6/1965 Dryden .................. B64G 1/625
434/34
5,667,167 A * 9/1997 Kistler ................... B64G 1/006
244/114 R
8,991,764 B2 * 3/2015 Auger .................... B64G 1/625
244/158.9
11,292,620 B1 * 4/2022 Molony .............. B64G 1/1071
11,691,767 B1 7/2023 Njah
2012/0153077 A1 * 6/2012 Balemboy .............. B64G 1/625
244/100 R
2018/0022477 A1 * 1/2018 Park ........................ B64G 1/006
244/110 E
2018/0044035 A1 * 2/2018 Mcdonnell .............. B63B 35/52
2018/0105287 A1 * 4/2018 Carreker .................. B64G 1/10
2018/0162553 A1 * 6/2018 Powers .................... B64G 5/00
2022/0258883 A1 * 8/2022 Im .......................... B64G 1/625
2023/0012410 A1 * 1/2023 Riordan .................. B64G 5/00

* cited by examiner

*Primary Examiner* — William L Gmoser
(74) *Attorney, Agent, or Firm* — Berggren Law Offices LLC; William R Berggren

(57) ABSTRACT

A non-tubular rocket stage landing apparatus for more reliably landing and returning a non-tubular rocket stage for reuse in subsequent main missions. The non-tubular rocket stage landing apparatus comprises a platform, a dampening and cushioning device, an exhaust diffuser device, a hollow shell, and a rotational device for angular aligning the hollow shell with the pass-through non-circular circumference of a vertically landing non-tubular rocket stage.

15 Claims, 7 Drawing Sheets

NON-TUBULAR ROCKET STAGE LANDING APPARATUS

FIELD OF THE INVENTION

This invention relates to the recovery of a non-tubular rocket stage for reuse.

BACKGROUND OF THE INVENTION

Rockets returning to Earth may vary from returning fuel-spent rocket booster stages to returning payload stages transporting things ranging from empty cargo container to cargo or people or both. These rockets have been tubular in shape with circular horizontal cross sections when vertical. However, as rockets carry larger payloads, the rockets are becoming less tubular. Some rockets have stages that are non-tubular with non-circular horizontal cross sections, such as, for example, fins, to provide additional drag when passing through the Earth atmosphere. Currently these returning rocket stages are retrieved by landing on land with the assistance of parachutes and helicopter carried nets on land or on water. As these landing rocket stages become larger, parachutes will no longer be useful. A non-tubular rocket configured to return to Earth and a non-tubular rocket stage configured to return to Earth will be used interchangeably.

There is a need for a non-tubular rocket stage retrieval apparatus that is based on the ground or on the water floating platform that is configured to better guide the landing non-tubular rocket stage into a safe vertical landing.

SUMMARY OF THE INVENTION

I invented a non-tubular rocket stage landing apparatus that is configured to improve safe retrieval of a non-tubular rocket stage having a non-circular cross section for reuse. Because the invention is a stand-alone apparatus, it does not add weight to the rocket by incorporating landing elements into the landing non-tubular rocket stage.

Specifically, the non-tubular rocket stage landing apparatus is configured for receiving a landing non-tubular rocket stage having a vertical perspective having at least one horizontal non-circular cross section along the vertical length and a downward view showing all non-circular circumference sections within a pass-through non-circular circumference, hereafter called a non-circular pass-through circumference and having a point most distant from the center axis of the platform. It comprises five elements, a platform, a dampening cushioning device, an exhaust diffuser device, a hollow shell, and a supporting, positioning, and rotating device. First the platform comprises an area, a perimeter, a top, a bottom, and a center and is configured, to be the landing site of the landing non-tubular rocket stage. Second the dampening cushioning device comprises a base attached to the bottom of the platform, a dampening region above the bottom region of the base, and a protruding top with a base element attached to the dampening region and configured to participate in diffusing ignited fuel away from the dampening cushioning device and the landing site of the landing non-tubular rocket stage and avoid having the hot gas blowing back to the landing non-tubular rocket stage. Third the exhaust diffuser device comprises (1) a base having a first diameter, a first inside surface, a first edge in communication with the platform to form multiple openings configured to direct hot gases from ignited fuel from the landing non-tubular rocket stage away from the dampening cushioning device on the platform, and avoid having the hot gas blowing back to the landing non-tubular rocket stage, (2) a mid-region with a second inside surface and a second diameter attached to the dampening cushioning device and the second inside surface, and (3) an upper section with a third diameter, a third inside surface, and a third edge configured to releasably attach to a base of a landing non-tubular rocket stage, the exhaust diffuser device having, a truncated cone shape with an outer surface and the first diameter is larger than the second diameter that is larger than the third diameter. Fourth the hollow shell configured to vertically pass a non-tubular rocket stage with a non-circular pass through circumference comprising (1) an overall first shape configured to receive the non-tubular rocket stage, an outer surface, an inner surface, (2) an upper end having an upper opening with a fourth edge with a first non-circular circumference having a second shape at least as large as the non-circular pass through circumference, (3) a lower region with a second circumference having a third shape at least as large as the non-circular pass through circumference and less than the first circumference and configured to expose the third edge of the exhaust diffuser device and (4) a flared bottom with a third circumference and an inside surface between the second circumference and the third circumference that is configured to enclose and be in communication with the outer surface of the exhaust diffuser device to direct ignited fuel and hot gases to the diffuser top and outward away from the dampening cushioning device and from the landing site of the landing non-tubular rocket stage to avoid blow back and damage the landing non-tubular rocket stage. Fifth the supporting, positioning, and rotating device configured to be in communication with the hollow shell and the landing non-tubular rocket stage with the non-circular pass-through circumference and to rotate the hollow shell to align the hollow shell with the landing non-circular rocket with the non-circular pass-through circumference of the rocket.

My invention provides a way to transport larger payloads into space and from space in a more economical manner. It is customized for each returning non-tubular rocket. The apparatus provides a shell configured to receive non-tubular rocket stages such a returning booster stage comprising multiple fuel carrying cylinders attached as one non-tubular bundle to carry heavier payloads. It is also configured to retrieve returning non-tubular rocket payload stages that may have non-tubular designs for various reasons specific to the purpose of each non-tubular rocket. One such reason is to have fins on opposite sides to increase surface area when the returning rocket is horizontal to increase drag to decrease some speed without use of fuel. My invention reduces weight on the non-tubular rocket stage by removing the built-in landing system such as four landing legs in the current SpaceX Falcon 9 rocket stage. In addition, incorporating the landing system reduces rocket costs and allows for reuse of the non-tubular rocket stage with less retrofitting than currently needed if retrofitting is even possible. All of these benefits result in a greater chance of safe landing of a non-tubular rocket stage on land or on a floating platform on water that permits reuse of the non-tubular stage with less expensive refurbishing operations.

As used herein:

"Non-tubular Rocket" refers to a rocket of spacecraft configured to vertically land on the surface of the Earth and having a vertical length having a non-circular cross section for at least one region along the vertical length, such as fins or a tube or any other asymmetric element on one side, or a rocket consisting of a cluster of rockets hereafter called a non-tubular rocket or non-tubular stage of a rocket.

BRIEF DESCRIPTION OF THE DRAWINGS

The invention will become more fully understood by the accompanying drawings, wherein like elements are represented by like reference characters, which are given by way of illustration only and thus are not limitative of the example embodiments herein.

DETAILED DESCRIPTION OF SOME EMBODIMENTS OF THE INVENTION

Figure 1:
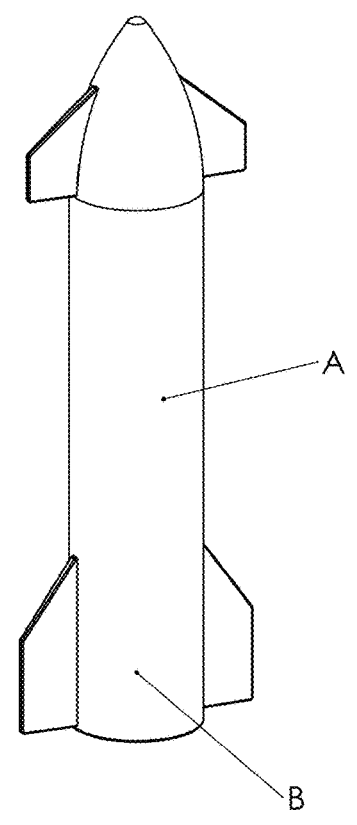
FIG. 1 is a perspective view of an embodiment of the invention with extended multiple grasping arms with separated ends to support the landing non-tubular rocket stage and an approaching the landing non-tubular rocket stage.
Figure 1:
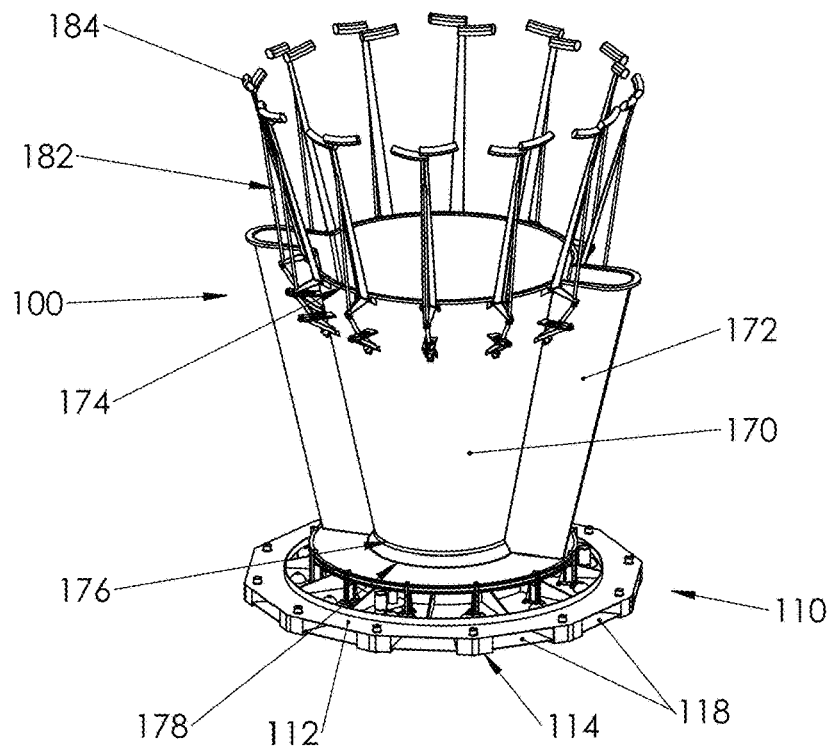

Many non-tubular rocket stages are currently being deposited in the water and retrieved for salvage or by parachute and nets carried by helicopters. There is a growing effort to retrieve the non-tubular rocket stages in a sufficiently undamaged state to be reused with minimal refurbishment operations to make space flight more economical. Some of these are platforms pulled by boats in the ocean that permit the non-tubular rocket stages to have a larger percentage of the fuel devoted to lifting larger payloads because less fuel is needed to just drop to the earth wherever they are and have a floating platform to be towed by a boat to be where the non-tubular stage is landing. However, maintaining a vertical landing can be challenging as the ocean moves, the wind blows on one side of the non-tubular stage or on both.

Some non-tubular stages are being designed to land on an area that provides a hard stable surface. The landing site is generally either the launch site or a preselected landing site. However, more fuel is required, and different challenges occur in maintaining a vertical orientation during landing. A higher percentage of fuel is needed to land a non-tubular rocket stage on land, at a particular spot, such as, for example, lift off, because fuel must be expended to guide the non-tubular stage back to where lift off occurred or to another preselected site. Also, safety becomes more important for landing non-tubular rocket stages than landing rocket booster stages when the former rocket carries humans or valuable payloads are desired.

In both cases, additional concerns exist. One concern is the non-tubular stage must be landed in a stable fashion to prevent it from tipping over and exploding. Another concern is the burning fuel exhaust must be safely dissipated away from the landing stage to prevent damage. Still another concern is cushioning the landing non-tubular rocket stage to minimize damage to the non-tubular stage. Anything added to the non-tubular stage to address these concerns adds weight that decreases the percent of the fuel that can be used to move the main rocket to its destination.

Recent efforts are focused on landing a tubular rocket stage, such as a non-tubular stage, on an apparatus on a platform on either water or land as described in U.S. Pat. No. 11,691,767 [Njah] ('767) that is incorporated herein by reference. Retrieval on the '767 apparatus would lessen subsequent refitting for reuse of a rocket non-tubular stage and lessen overall cost of rocket travel. However, ('767) is for a landing rocket stage that is tubular with a horizontal circular cross section when landing vertically, such as a returning non-tubular rocket stage. Also, it lacks a supporting and positioning device to better align the rocket nontubular landing apparatus with the returning non tubular rocket stage.

The invention addresses the challenges by providing a non-tubular rocket stage landing apparatus separated from the non-tubular stage and a supporting and positioning device to better align the rocket nontubular landing apparatus with the returning non tubular rocket stage. The apparatus allows for a focus on aspects needed to minimize non-tubular stage damage during landing without increasing the percentage of fuel required. Some elements may be quite heavy but minimize these problems and focus on maintaining safe non-tubular stage landing for subsequent reuse. In addition, the apparatus of this invention is reusable with minimal refurbishing operations.

Specifically, the non-tubular rocket stage landing apparatus comprises five elements, a platform, a dampening cushioning device, an exhaust diffusion device, a hollow shell, and a supporting, positioning, and rotating device.

The platform comprises an area, a perimeter, a top, a bottom, and a center. The area is large enough to offer a stable site for the non-tubular rocket stage landing apparatus. A larger area may be beneficial when floating the apparatus on water than when positioning it on land.

In some embodiments, the platform comprises multiple channels to allow hot gases from ignited fuel from the landing non-tubular rocket stage to be displaced away from the non-tubular rocket stage.

In some embodiments, the platform comprises accumulators containing extinguishing agent, such as liquid carbon dioxide used to extinguish ignited fuel and to cool the landing non-tubular rocket stage.

In some embodiments, the platform furthermore comprises wheels configured to move the non-tubular rocket stage landing apparatus in a latitude and longitude manner within an area to be self-positioning to a descending overhead target of a ground platform or on a water floating platform. The wheels are configured to better align the apparatus with the actual location where the landing non-tubular stage is targeting. In some embodiments, the wheels are motor-driven and motor-positioned. The wheels may be similar to those on large aircraft. The wheels may be in pairs. In some embodiments, the wheels are directional. The wheels may be individually driven in both speed and direction of rotation to allow for more precise movement to a target area. In some embodiments the wheels are automatically or manually actuated and remotely driven and positioned using sensors or visually through a webcam to position the apparatus under the final position in space of the descending non-tubular rocket stage.

In some embodiments, platform comprises a structure to stabilize the position of the dampening cushioning device attached to the platform. A lower stabilizing truncated cone is attached to the platform and in communication with the dampening cushioning device to provide additional stability to the dampening cushioning device during its operation during landing of a non-tubular rocket stage.

The dampening cushioning device is used to further decrease the speed of the landing non-tubular rocket stage to a stationary position to permit safe landing and minimize reconditioning before reuse of the non-tubular rocket stage. The dampening cushioning device comprises a base attached to the center of the platform, a dampening region above the bottom region of the base, and a protruding top with a base element attached to the dampening region and configured to participate in diffusing hot gases from ignited fuel away from the dampening cushioning device and the landing site of the landing non-tubular rocket stage and avoid having the hot gas blowing back to the landing non-tubular rocket stage.

In one embodiment, the base of the dampening cushioning device is attached to the platform, usually at its center to maximize horizontal stability of the non-tubular rocket stage landing apparatus during use. The dampening region comprises a shell, a piston, and a dampening element. The shell attaches to the base and encompasses the dampening elements and a horizontal piston element that rests on top of the dampening element. The piston further comprises upper vertical piston elements that extend from the top of the horizontal piston element and pass moveably through the top of the shell to attach to the base element of the protruding top. The piston also comprises a lower vertical element that extends from the bottom of the horizontal element, through the base of the shell attached to the platform and moveably through the shell into the platform below the base. When weight is applied to the exhaust diffuser device, the upper and lower vertical piston elements pass through the shell pushing the horizontal piston element down against the dampening element to compress it against the bottom of the shell. The dampening element for the above dampening cushioning device is a large area actuator. Other dampening cushioning devices may be used with other dampening elements such as heavy metal springs and magnetic repelling systems but require dampening cushioning devices with different structures. The protruding top region has multiple nozzles configured to spray pressurized extinguishing agent into the bottom of the landing stage to extinguish any remaining ignited fuel and to remove the heat.

In another embodiment, the bottom of the upper region is in communication with and attached to the upper end of an upper truncated cone whose bottom end is affixed to the exhaust diffuser base and top end to the dampening cushioning protruding top base to form the lower end of the exhaust chamber. The exhaust diffuser device comprises a base with a first diameter, a first inside surface, and a first edge in communication with the platform to form multiple openings configured to direct ignited fuel from the landing non-tubular rocket stage away from the dampening cushioning device on the platform and the landing site of the landing non-tubular rocket stage and avoid having the hot gas blowing back to the landing non-tubular rocket stage, a mid-region with a second inside surface and a second diameter attached to the dampening cushioning device and the second inside surface, and an upper section with a third diameter, a third inside surface, and a third edge configured to releasably attach to a base of a landing non-tubular rocket stage, the exhaust diffuser device having, a truncated cone shape with an outer surface and the first diameter is larger than the second diameter that is larger than the third diameter. This is not easily accomplished with a landing rocket nontubular stage that relies upon itself to provide all elements of achieving a stable vertical landing requiring minimal refurbishing operations before reuse in subsequent rocket launches.

The mid-region comprises attached to the base of the upper region of the dampening cushioning device multiple exhaust deflectors passing from the second inside surface of the exhaust diffuser device to bottom area of the protruding top region of the dampening cushioning device. Each deflector is angled down on both sides to direct exhaust down and outward through multiple openings at the bottom of the exhaust diffuser device where it contacts the platform to exit channels on the platform. This region is where the landing non-tubular rocket stage bottom contacts the non-tubular rocket stage landing apparatus.

The top opening with a third diameter is large enough to accommodate a landing non-tubular rocket stage.

In some embodiments, extinguishing agent is passed to the base of the landing non-tubular rocket stage to extinguish any remaining ignited fuel and to cool it off. Extinguishing agent, stored in accumulators. It is configured to pass from storage tanks or accumulators dispersed about the platform through flexible hoses to the base of the dampening cushioning device and up through the nozzles in the protruding top toward the landed non-tubular rocket stage bottom. Extinguishing agent, now in the form of hot gases, is passed along the path of the leaving exhaust.

The extinguishing agent comprises materials that are stable and functional as extinguishing agents at temperatures experienced during exposure of burning rocket fuel and added to temperatures caused by friction with the atmosphere during the landing of the non-tubular rocket stage. Suitable exhausting agents include, for example, at least one of either liquid carbon dioxide or pressurized powder extinguishing agents that are stored typically under pressures of over 1000 psi.

The hollow shell is configured to vertically pass a non-tubular rocket stage with a non-circular pass-through circumference comprising an overall first shape configured to receive the non-tubular rocket stage. The hollow shell has an outer surface, an inner surface, an upper end that has an upper opening with a fourth edge with a first non-circular circumference having a second shape at least as large as the non-circular pass-through circumference. It also has a lower region with a second circumference that has a third shape at least as large as the non-circular pass-through circumference of the vertically landing non-tubular rocket stage and less than the first circumference. The lower region is configured to expose the third edge of the exhaust diffuser device. The hollow shell also has a flared bottom with a third circumference that is circular. It also has an inside surface between the second circumference and the third circumference that is configured to enclose and be in communication with the outer surface of the exhaust diffuser device. This is to direct ignited fuel to the diffuser top and outward away from the dampening cushioning device and from the landing site of the landing non-tubular stage to avoid blow back and damage to the landing non-tubular rocket stage.

The hollow shell has dimensions suitable for stable landing of the non-tubular rocket stage in communication with the platform. The hollow shell is vertically centered on the dampening cushioning device on the platform. The first circumference is the approximate diameter of a target area that the non-tubular stage is configured to land within. The lower circumference is just larger than the circumference of the landing non-tubular stage. The height is suitable to minimize occurrence of toppling over of the non-tubular stage. The height is below the full height of the non-tubular stage to minimize weight that provides minimal further stability.

The rotating device is configured to be in communication with the hollow shell and the landing non-tubular rocket stage with the non-circular pass-through circumference and to rotate the hollow shell to align the hollow shell with the landing non-circular rocket with the non-circular pass-through circumference of the non-tubular rocket stage.

In some embodiment, the rotating device further comprises a circular ring-shaped base having a bottom, a circular circumference, an outside edge, an outside diameter extending beyond the furthest point on the bottom of the non-circular pass-through circumference and an inside diameter attached to the outer surface of the hollow shell below the first circumference and above the second circumference. The rotating device is in communication with the circular ring-shaped base to lift the hollow shell and rotate hollow shell in a controlled manner. Sensors placed on both the non-tubular rocket stage and the non-tubular rocket stage landing apparatus may be configured to guide the hollow shell into its proper angular position to receive the landing non-tubular rocket stage successfully.

In some embodiments the rotating device further comprises (1) a circular ring-shaped base having a bottom, a circular circumference, an outside edge, an outside diameter extending beyond the furthest point on the non-circular pass-through circumference and an inside diameter attached to the outer surface of the hollow shell below the first circumference and above the second circumference, (2) the rotating device in communication with the circular ring-shaped base to support the hollow shell and rotate the hollow shell in a controlled manner, and (3) at least three supporting rollers with axes parallel to the platform and are attached to the platform, being sat on by the bottom of the ring-shaped base and spaced equally beneath the ring-shaped base to support the ring in a rotational movement about the center of the platform. The primary purpose of these rollers is to support the whole weight of the rotation device while the rotating is in action.

In some embodiments the rotating device further comprises (1) a circular ring-shaped base having a bottom, a circular circumference, an outside edge, an outside diameter extending beyond the furthest point on the non-circular pass-through circumference and an inside diameter attached to the outer surface of the hollow shell below the first circumference and above the second circumference, (2) the rotating device in communication with the circular ring-shaped base to position the hollow shell and rotate the hollow shell in a controlled manner, and (3) the at least three positioning rollers with axes perpendicular to the platform are attached to the platform, in contact with the inside edge of the ring-shaped base and spaced equally around the ring-shaped base to maintain the ring in a position centered on the center of the platform. The primary purpose of these rollers is to maintain the platform center position of the rotating action.

Appropriate dimensions depend upon the actual rocket nontubular stage that is being landed. A Starship rocket by SpaceX will be used in this document but the invention will benefit in a comparable manner other rockets with nontubular stages that are desired to be retrieved safely. Starship is typically 50 meters (m) high, 9 m in diameter, and 1,250 Tons in weight. Its six engines generate 3.3 million pounds of thrust at sea level. The core of the rocket, called the nontubular stage that is being retrieved, is about 50 m high, and 9 m in diameter and 15 m in width. The rocket has a height of between just over half that of the non-tubular stage and under the full height of the non-tubular stage. Its six engines help it lift payloads into space and land the rocket upper stage safely on the ground. It is known as the SpaceX Starship.

For the above non-tubular stage, an embodiment of the hollow shell has a first diameter of approximately 17 m. The landing nontubular stage passes from a descending speed of 30 Km/h at an altitude of about 500 m to stationary on landing.

For some embodiments, the hollow shell further comprises a collection of multiple arms with a first arm end rotatably attached and equally distanced about the outer surface of the first circumference of the first end to, a second arm end extending upward and outward from the first end, having curved horizontal tips, and configured to rotate inward to encompass a landing non-tubular rocket stage with the adjacent tips intertwining and without touching each other.

Materials used for the rocket nontubular stage landing apparatus vary as needed. In general, materials in contact with the landing non-tubular stage should be strong enough to remain functional under the weight and temperatures involved during use. Use of materials with structures having composite materials such as fiber glass, fiber carbon, and a honeycomb construction offers significant reductions in weight without corresponding loss in strength.

FIGS. 1-5 further illustrate the nature of several embodiments of the invention. Similar elements have the same numbers.

FIG. 1 is a perspective view of an embodiment of the invention with extended grasping arms with separated ends to support the landing non-tubular rocket stage and an approaching landing non-tubular rocket stage. A landing non-tubular rocket stage (A) is shown with its bottom end region (B) approaching an embodiment of the non-tubular rocket stage landing apparatus (100) comprising a platform (110) with a platform top (112), a platform bottom (114) (not seen), a platform center (116), and multiple exhaust channels (118). A hollow shell (170) with a hollow shell first shape (172) is shown in communication with platform 110 and having a hollow shell flared bottom edge (178) narrowing in a hollow shell lower section (176) before widening to a hollow shell top edge (174). A collection of hollow shell multiple arms (182) is rotatably attached to the outside surface of hollow shell 170 each with a hollow shell horizontal end (184) is shown below landing non-tubular rocket stage A.

Figure 2:
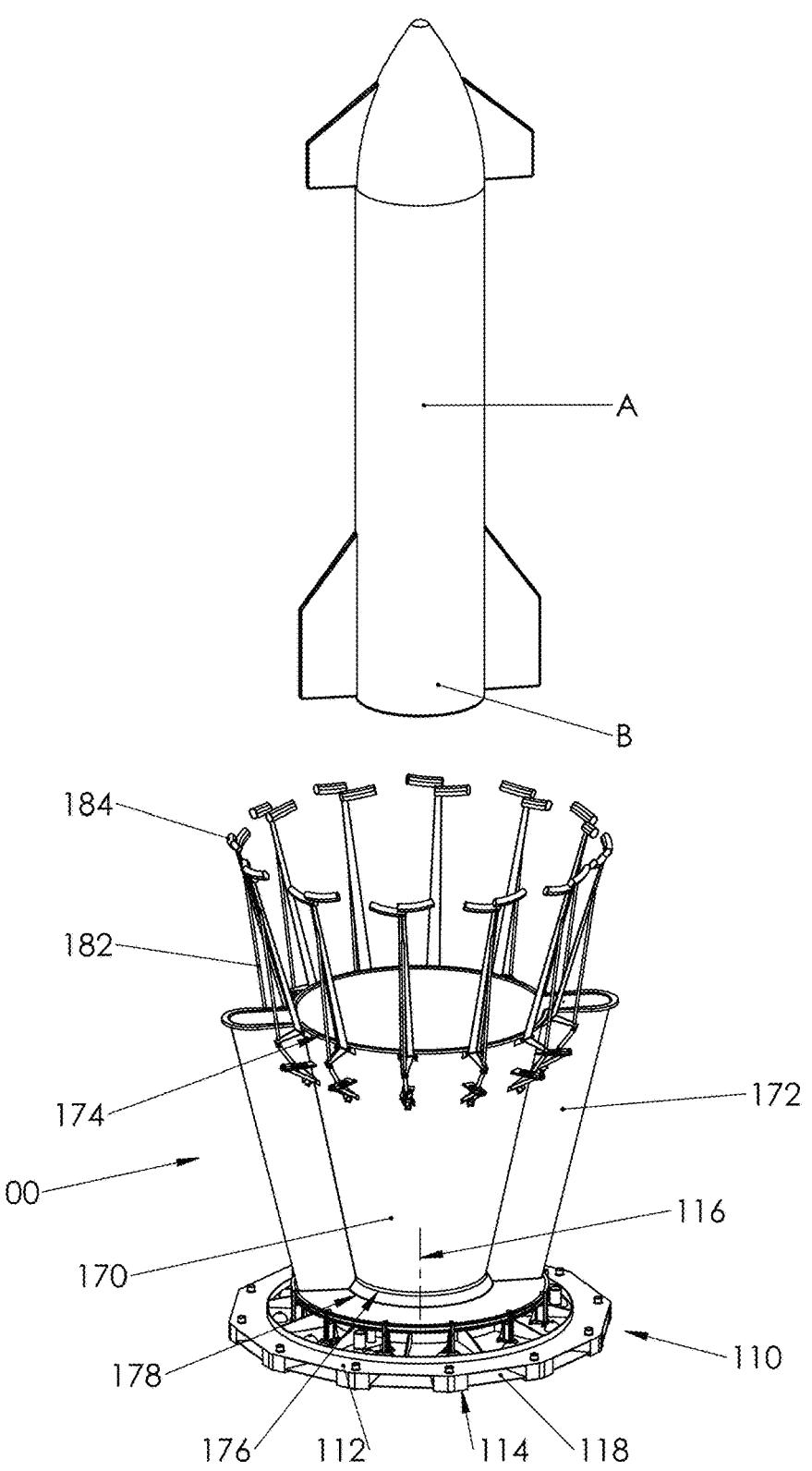
FIG. 2 is a perspective view of the embodiment shown in FIG. 1 with the landing non-tubular rocket stage closer and the hollow shell rotated to align with the landing non-tubular rocket stage.

FIG. 2 is a perspective view of the embodiment shown in FIG. 1 aligned and oriented, and receiving landing non-tubular stage with partially closed grasping arms with separated ends that support the landing non-tubular rocket stage. Landing non-tubular rocket stage A is shown with its bottom end region (B) aligned with and entering non-tubular rocket stage landing apparatus 100 comprising platform 110 with platform top 112, platform bottom 114 (not seen), platform center 116 aligned with non-tubular rocket stage A, and multiple exhaust channels 118. Hollow shell 170 with hollow shell first shape 172, a customized non tubular shape for a type of non-tubular rocket stage A, is shown in communication with platform 110 and having hollow shell flared bottom edge 178 narrowing in hollow shell lower section 176 before widening into hollow shell top edge 174. Collection of hollow shell multiple arms 182 is rotatably attached to the outside surface of hollow shell 170 each with hollow shell horizontal end 184 is shown below landing non-tubular rocket stage A.

Figures 3, 3A:
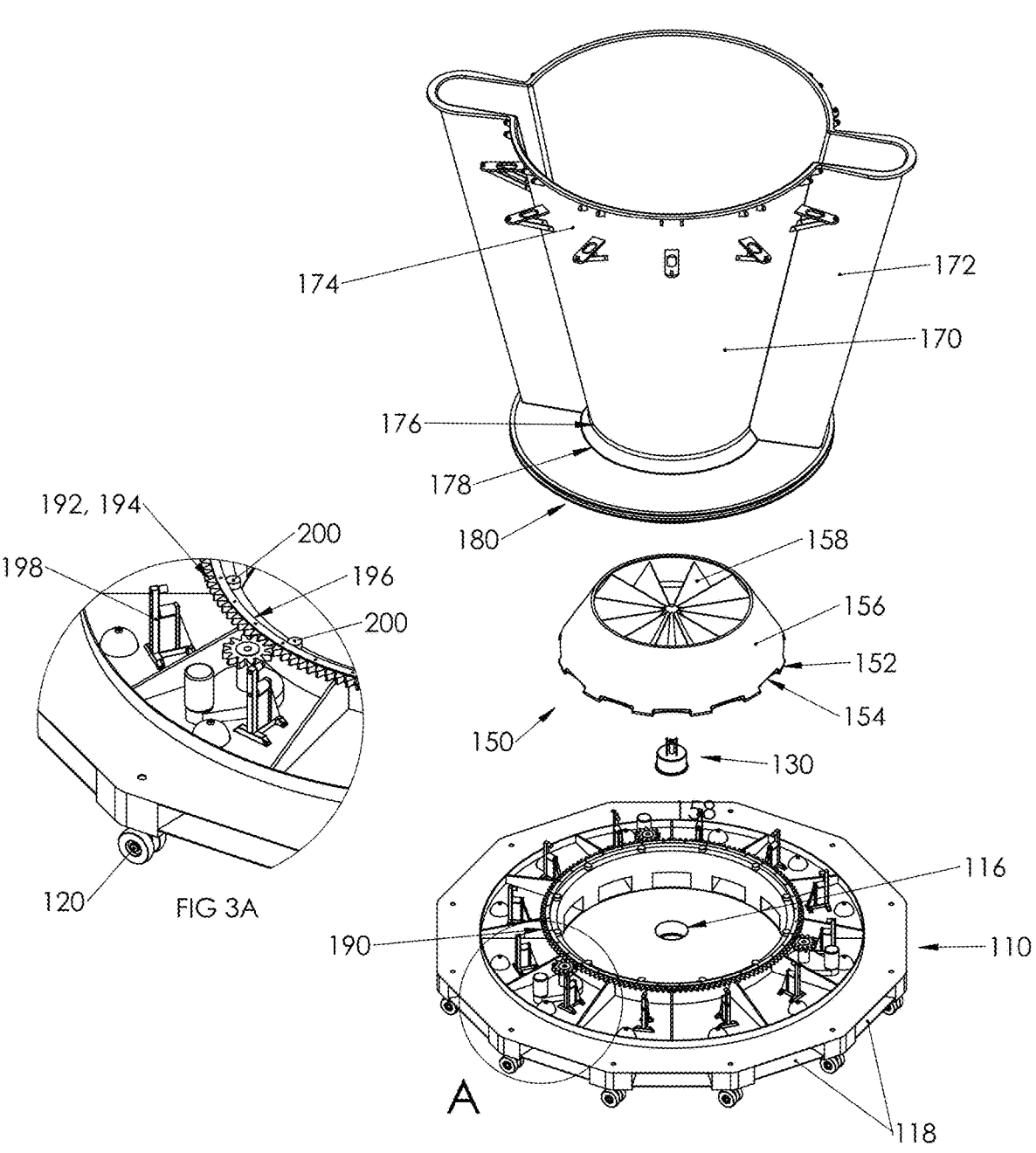
FIG. 3 is an exploded view of the embodiment of FIG. 1 without the collection of multiple arms and FIG. 3A is a cut away section showing a wheel and a portion of the rotating device.

FIG. 3 is an exploded view of the embodiment of FIG. 1 without the collection of multiple arms and FIG. 3A is a cut away section showing a wheel and a portion of the rotating device. Platform 110 is shown in communication with a rotating device (190) comprising a rotating circular ring-shaped notched element (192), rotating device outer diameter (194) attached to the underside of the hollow shell flange bottom (not shown), a rotating device inner diameter (196), a rotating device supporting roller (198) and a rotating device positioning roller (200). A dampening cushioning device (130) is shown positioned above platform cents 116. An exhaust diffuser device (150) is shown with exhaust diffuser device base (152) with exhaust diffuser device multiple slots (154) in exhaust diffuser device base 152 to form holes when contacting platform channels 118, and an exhaust diffuser device mid-region (156) containing multiple angled deflector elements (158) in the exhaust diffuser device 150 to direct hot gases to the holes. Hollow shell 170 is shown with first shape 172, narrowing in lower section 176 to flared bottom edge 178 that is attached to rotating ring-shaped base 196 (not seen). FIG. 3A shows a platform wheel (120) and a portion of the rotating device showing a portion of the outer diameter (194) of rotary device circular ring-shaped base (192) with notches, a rotating device supporting roller (198) and a rotating device positioning roller (200).

Figure 4:
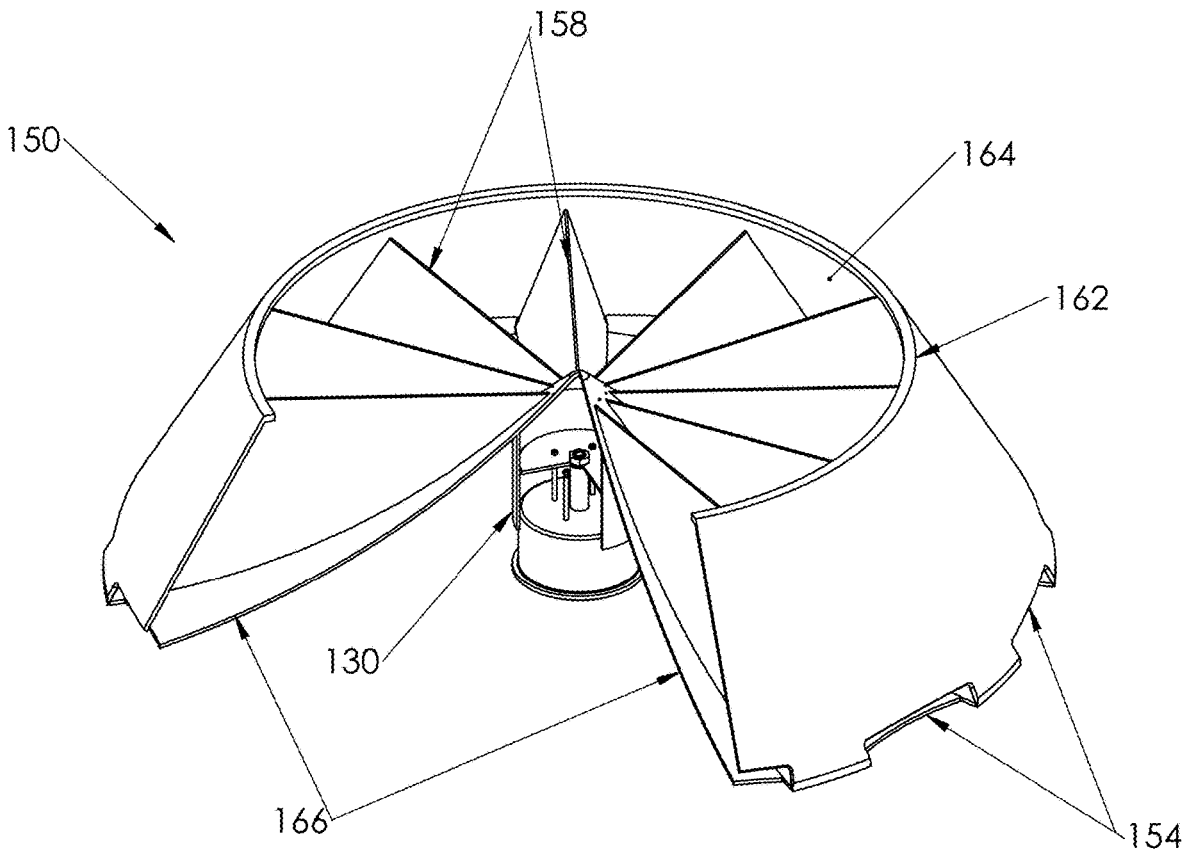
FIG. 4 is an enlarged view of just the exhaust diffuser device connected to the dampening cushioning device and shown in FIG. 3 with a cutaway showing an inside configuration of the connection and several exhaust deflection elements.

FIG. 4 is an enlarged view of just the exhaust diffuser device connected to the dampening cushioning device and shown in FIG. 3 with a cutaway showing an inside configuration of the connection and several exhaust deflection elements. Shown is exhaust diffuser device 150 connected to dampening cushioning device 130. Exhausting diffuser device 150 is shown cut away to show dampening cushioning device 130 and also multiple angled deflector elements 158 attached to exhaust diffuser device inside surface (164) attached to dampening cushioning device 130 and the exhaust diffuser device upper truncated cone (166), in communication with the dampening cushioning device 130 to form chambers to funnel rocket exhaust to platform channels 1118 (not shown). Also shown is a dampening cushioning device protruding top (136).

Figure 5:
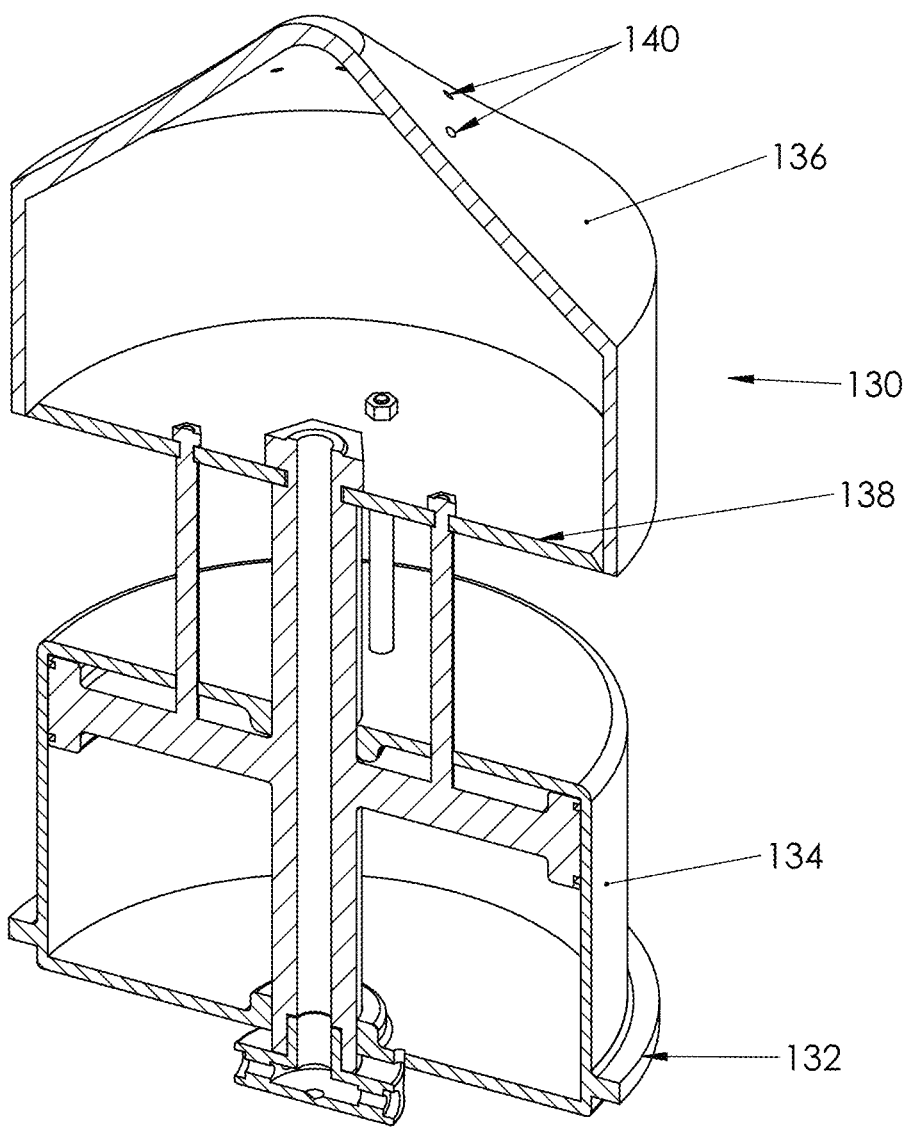
FIG. 5 is an expanded cross-section view of the dampening cushioning device shown in FIG. 3 and FIG showing the, and extinguishing spray nozzle with exhaust channels.

FIG. 5 is an expanded cross-section view of the dampening cushioning device shown in FIG. 3 showing the dampening cushioning device in an un-collapsed state within a dampening cushioning region in a shell by the landing rocket non-tubular rocket stage pushing on exhaust diffuser top (not shown). Shown is dampening cushioning device 130 with a dampening cushioning base (132) attached to platform center 116 (not shown), a dampening cushioning mid-region (134), and dampening cushioning protruding top 136 with a dampening cushioning protruding top base (138) and with multiple extinguishing spray nozzles (140) with exhaust channels 144.

A method of using a rocket nontubular stage landing apparatus to retrieve a landing nontubular stage sufficiently cleanly to reuse the landing nontubular stage with minimal refurbishments comprises six steps. One step is providing a rocket nontubular stage landing apparatus comprising four elements that have been discussed above. Another step is positioning the rocket nontubular stage landing apparatus over a pre-determined area consisting of either stationary land or a floating platform over water that is going to be used as a target. Still another step is providing a landing nontubular stage descending to a pre-determined target area on earth containing the rocket nontubular stage landing apparatus after decoupling from a main rocket. Another step is refining the position of the rocket nontubular stage landing apparatus to be centered to the descending landing nontubular stage to receive the landing nontubular stage Refinement may be accomplished automatically or manually and by using sensors or visual means through a webcam. Still another step is retrieving the rocket nontubular stage intact to form a retrieved rocket nontubular stage. In some embodiments of the first method, the method of using a rocket nontubular stage landing apparatus comprises another step. The fifth step is reusing the retrieved rocket nontubular stage with minimal refurbishing operations.

In some embodiments of the first method, the method of using a rocket nontubular stage landing apparatus comprises another step. The fifth step is reusing the retrieved rocket nontubular stage with minimal refurbishing operations.

In some embodiments of the first method, the method uses an additional element in the nontubular stage landing apparatus and an additional step. The additional element is a collection of multiple arms with a first arm end rotatably attached equally distanced about the first circumference of the first end of the truncated hollow cone a second arm end extending upward and outward from the first end. Each second end may or may not have curved horizontal tips and is configured to rotate inward to encompass a landing rocket nontubular stage without the adjacent tips touching each other. The additional step is drawing the collection of multiple arms inward around the landing nontubular stage as it descends onto the rocket nontubular stage landing apparatus.

In some embodiments of the previous method, the method uses an additional element in the nontubular stage landing apparatus and an additional step. The additional element is collection of a multiple rod elements each extending horizontally from each second end to form a circular collection of rods about the landing nontubular stage with adjacent rods touching and configures to stabilize the vertical orientation of the landing rocket nontubular stag. The indrawn rods form a circular pattern having a diameter similar to the landed rocket nontubular stage to increase the ease of the returned nontubular stage remaining vertical and not falling over to become damaged. The additional step is drawing the collection of multiple rods inward, as the collection of arms are drawn inward, around the landing nontubular stage as it descends onto the rocket nontubular stage landing apparatus. This provides additional support for holding the nontubular stage stable than just using the arms alone as provided in the previous embodiment.

In some embodiments of the first method, the truncated hollow cone further comprises at least one powered winding contacting the inner surface of the cone in an appropriate configuration configured to create a magnetic field within the cone capable of slowing down a descending nontubular stage to reduce its descending speed still further without using more fuel.

In some embodiments of the first method, the platform further comprises multiple spray nozzles configured to deposit extinguishing agent onto the dampening cushioning device and base of a nontubular stage to the dampening cushioning device to reduce heat stress upon the landing apparatus and base of the landing nontubular stage.

In some embodiments of the first method, the platform further comprises wheels configured to move the rocket nontubular stage landing apparatus to be self-positioned to a descending overhead target area of ground or on a floating platform.

In some embodiments of the previous method, the wheels are from a group consisting of motor driven, directional, and manually remote driven.

Figure 6:
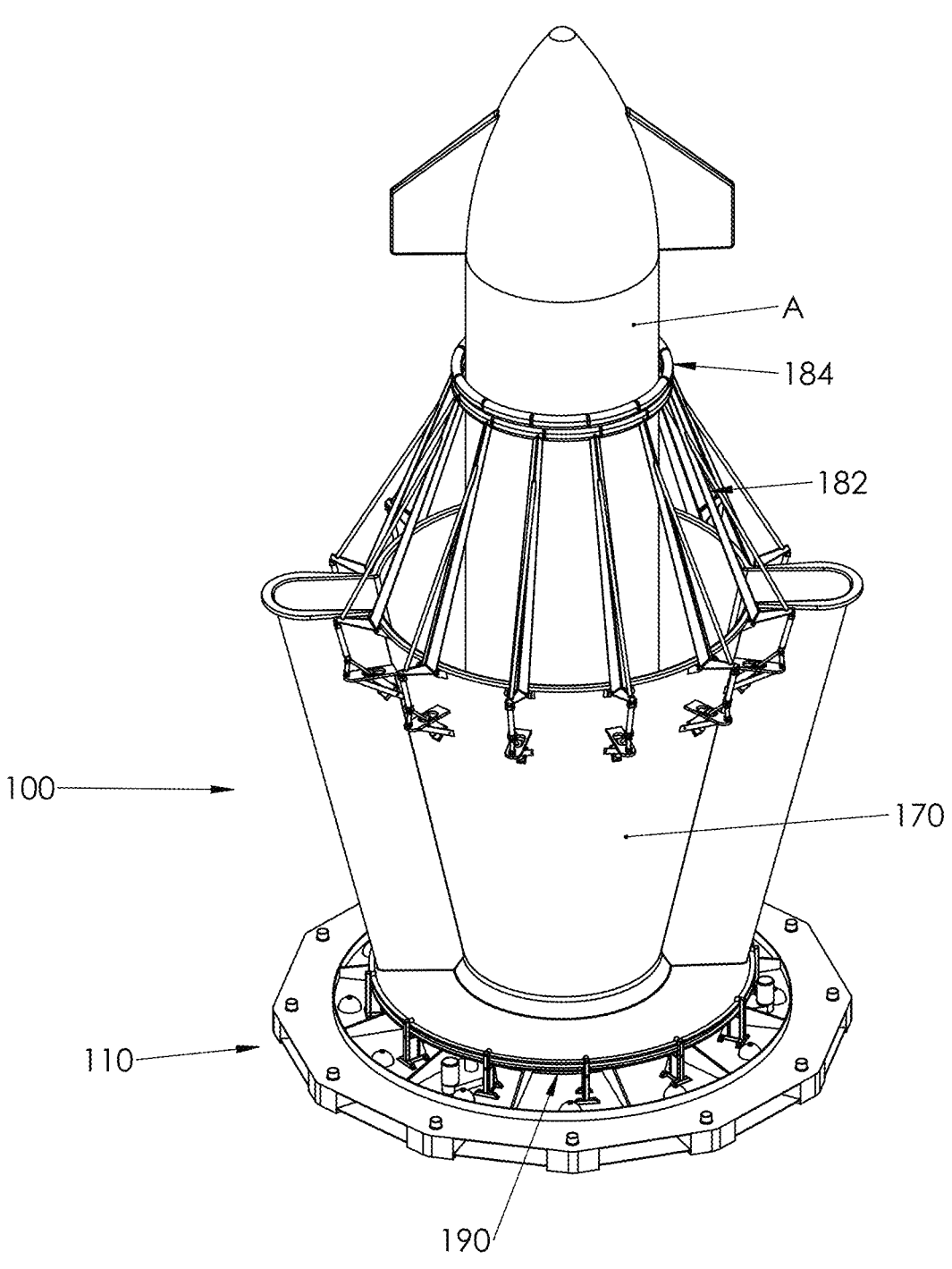
FIG. 6 is a perspective view of the embodiment shown in FIG. 1 with the landing non-tubular rocket stage landed and the extended grasping multiple arms rotated inward with the ends touching to better support the landed non-tubular rocket stage.
Figure 7:
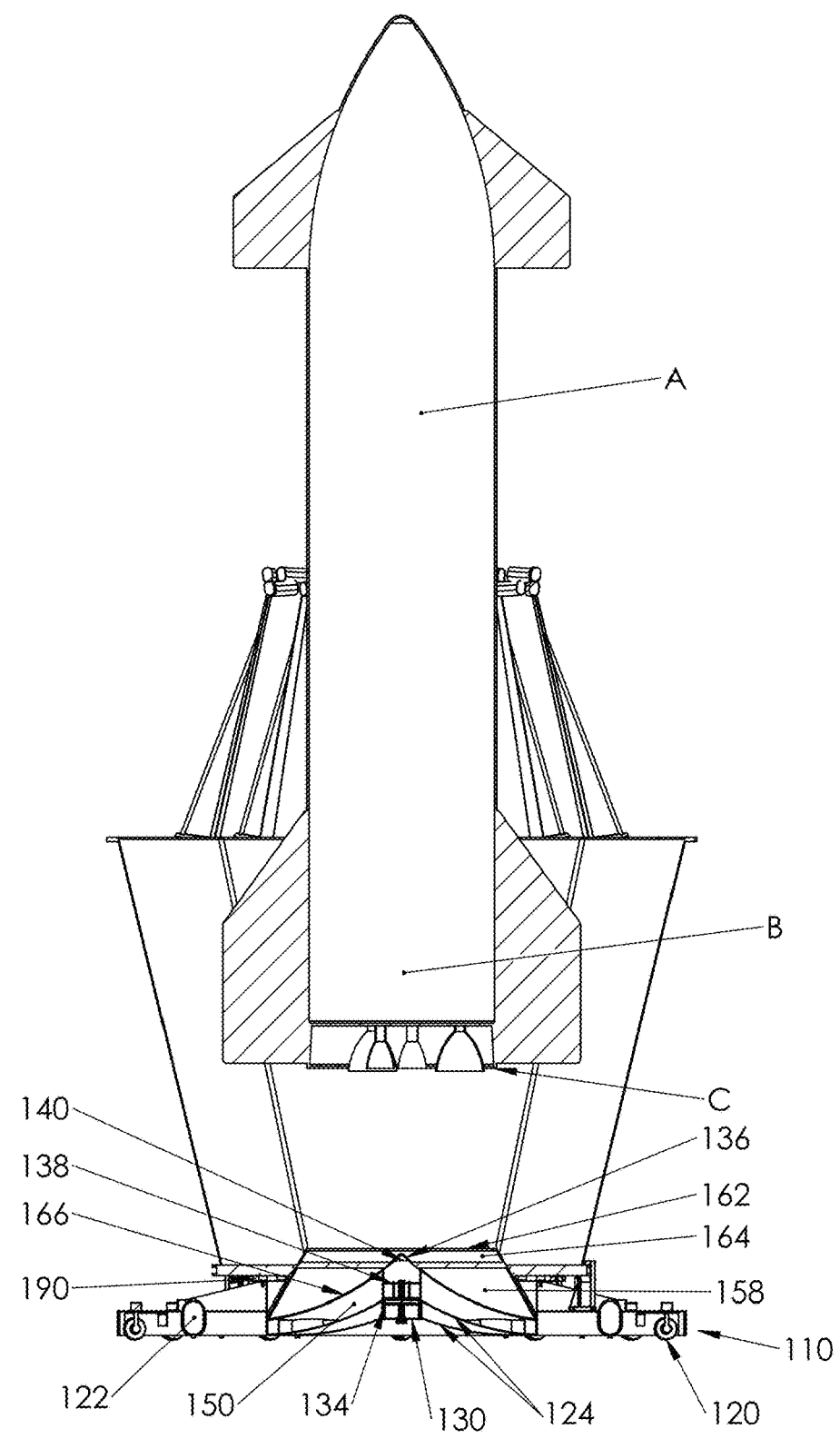
FIG. 7 is a cross-section view of the embodiment shown in FIG. 6.

FIGS. 6 and 7 further illustrate the interaction of the various parts during landing.

FIG. 6 is a perspective view of the embodiment shown in FIG. 1 with the landing non-tubular rocket stage landed and the extended grasping rotated inward with the ends touching to better support the landed non-tubular rocket stage. Non-tubular rocket stage A shown landed in non-tubular rocket state landing apparatus 100. Non-tubular rocket stage A is shown enclosed with hollow shell arm tips 184 of hollow shell arms 182 rotatably attached to hollow stage 170. Rotating device 190 in communication with platform 110 and attached to hollow shell flared bottom surface 180 has rotated hollow shell 170 to receive non-tubular rocket stage A.

FIG. 7 is a cross-section view of the embodiment shown in FIG. 6. Non-tubular rocket stage end (C) of non-tubular rocket stage bottom (B) is shown about to resting on top end 162 of exhaust diffusing device 150. Dampening cushioning device protruding top base 138 is attached to exhaust diffuser device multiple angled deflector elements 158 and to the top of upper truncated cone 166, and has dampening cushioning device multiple nozzles 140 from which pressurized extinguishing agent is sprayed into the chamber formed by exhaust diffuser inside surface 164 and upper truncated cone 166 whose bottom is attached to exhaust diffuser base 152. Exhaust agent is moved from pressurized platform tanks or containers (122) toward inside of dampening cushioning device protruding top 136 through dampening cushioning device multiple nozzles 140. Then exhaust gases exit through platform channels 118 (shown in FIG. 3). A lower stabilizing truncated cone (124) with one end attached to platform 110 and the other end in communication with dampening cushioning mid-region 134 in two spots to further stabilize during landing the vertical position of dampening cushioning 130 attached to platform 110. A set of motor-driven and motor-positioned wheels 120 are rotatably attached and equally spaced, distanced to the platform to drive the landing non-tubular rocket stage apparatus to its desired destination. Rotating device 190 is shown between hollow shell 170 and platform 110.

Other modifications and changes regarding my invention will be apparent to those skilled in the art. The invention is not limited to the embodiments chosen for purposes of disclosure and covers all changes and modifications that do not constitute departures from the true spirit and scope of this invention.

A list of elements used in the figures follows.

| # | Item |
|---|------|
| A | Non-tubular rocket stage |
| B | NTRS bottom |
| C | NTRS end |
| 100 | Landing apparatus |
| 110 | Platform |
| 112 | P top |
| 114 | P bottom |
| 116 | P center |
| 118 | P channels |
| 120 | P wheel |
| 122 | P pressurized tanks |

-continued

| # | Item |
|---|------|
| 124 | P lower stabilizing truncated cone |
| 130 | Dampening cushioning device |
| 132 | DC base |
| 134 | DC mid-region |
| 136 | DC protruding top |
| 138 | DC protruding top base |
| 140 | DC multiple nozzles |
| 150 | Exhaust diffuser device |
| 152 | ED Base |
| 154 | ED base slots |
| 156 | ED mid-region |
| 158 | ED multiangle deflector elements |
| 162 | ED top end |
| 164 | ED inside surface |
| 166 | ED upper truncated cone |
| 170 | Hollow shell |
| 172 | HS first shape |
| 174 | HS upper end |
| 176 | HS lower end |
| 178 | HS flared bottom |
| 180 | HS flared bottom inside surface |
| 182 | HS arm |
| 184 | HS horizontal arm tip |
| 190 | Rotating device |
| 192 | R circular ring-shaped notched element |
| 194 | R outer diameter |
| 196 | R inner diameter |
| 198 | R supporting roller |
| 200 | R positioning roller |

I claim:

1. A non-tubular rocket stage landing apparatus for receiving a landing non-tubular rocket stage having a vertical perspective having at least one horizontal non-circular cross section along the vertical length and a downward view showing all non-circular circumference sections within a pass through non-circular circumference, hereafter called a non-circular pass through circumference and having a point most distant from the center axis of the platform, the non-tubular rocket stage landing apparatus comprising a platform comprising an area, a perimeter, a top, a bottom, and a center, and configured to be the landing site of the landing non-tubular rocket stage, a dampening cushioning device comprises a base not attached to but in rotational communication with the center of the platform, a dampening cushioning region above the base, and a protruding top with a base element attached to the dampening cushioning region and configured to participate in diffusing hot gas from ignited fuel away from the dampening cushioning device and the landing site of the landing non-tubular rocket stage and avoid having the hot gas blowing back to the landing non-tubular rocket stage, an exhaust diffuser device comprising (1) a base having a first diameter, a first inside surface, a first edge in communication with the platform to form multiple openings configured to direct hot gases from ignited fuel from the landing rocket nontubular stage away from the dampening cushioning device on the platform, and avoid having the hot gas blowing back to the landing non-tubular rocket stage, (2) a mid-region with a second inside surface and a second diameter attached to the dampening cushioning device and the second inside surface, and (3) an upper section with a third diameter, a third inside surface, and a third edge configured to releasably attach to a base of a landing non-tubular rocket stage apparatus, the exhaust diffuser device having, a truncated cone shape with an outer surface and the first diameter is larger than the second diameter that is larger than the third diameter, a hollow shell configured to vertically pass the non-tubular rocket stage with a non-circular pass-through circumference comprising (1) an overall first shape configured to receive the non-tubular rocket stage, an outer surface, an inner surface, (2) an upper end having an upper opening with a fourth edge with a first non-circular circumference having a second shape at least as large as the non-circular pass through circumference, (3) a lower region with a second circumference having a third shape at least as large as the non-circular pass through circumference and less than the first circumference and configured to expose the third edge of the exhaust diffuser device and (4) a flared bottom with a third circumference and an inside surface between the second circumference and the third circumference that is configured to enclose and be in communication with the outer surface of the exhaust diffuser device to direct ignited fuel to the diffuser top and outward away from the dampening cushioning device and from the landing site of the landing non-tubular rocket stage to avoid blow back and damage to the landing non-tubular rocket stage, and a rotational device attached to the flared bottom of the hollow shell and configured to rotate the hollow shell to align the hollow shell with the landing non-tubular rocket stage with the non-circular pass-through circumference of the non-tubular rocket stage.

2. The non-tubular rocket stage landing apparatus of claim 1, wherein the rotational device further comprises a circular ring-shaped base having a bottom, a circular circumference, an outside edge, an outside diameter extending beyond the furthest point on the non-circular pass-through circumference and an inside diameter attached to the outer surface of the hollow shell below the first circumference and above the second circumference, the rotating device in communication with the circular ring-shaped base to support the hollow shell and rotate the hollow shell in a controlled manner, comprising at least three supporting rollers with axes parallel to the platform and attached to the platform, being sat on by the bottom of the ring-shaped base, and spaced equally beneath the ring-shaped base to guide the ring-shaped base in a rotational movement about the center of the platform to maintain the ring in a position centered on the center of the platform, and a motor configured to rotate the ring-shaped base.

3. The non-tubular rocket stage landing apparatus of claim 1, wherein the rotational device further comprises a circular ring-shaped base having a bottom, a circular circumference, an outside edge, an outside diameter extending beyond the furthest point on the non-circular pass-through circumference and an inside diameter attached to the outer surface of the hollow shell below the first circumference and above the second circumference, the rotating device in communication with the circular ring-shaped base to position the hollow shell and rotate the hollow shell in a controlled manner, comprising at least three positioning rollers with axes perpendicular to the platform are attached to the platform, in contact with the inside edge of the ring-shaped base and spaced equally around the ring-shaped base to maintain the ring in a position centered on the center of the platform.

4. The rocket non-tubular rocket stage landing apparatus of claim 1, wherein the hollow shell further comprises a collection of multiple arms with each arm end rotatably attached to equally spaced and distanced about the outer surface of the first circumference of the hollow shell and configured to rotate upward and outward initially to extend guidance of a landing non-tubular rocket stage above the first circumference, each arm having an end with a curved horizontal tip and configured to rotate inward to encompass a landing non-tubular rocket stage without the adjacent tips touching each other.

5. The non-tubular rocket stage landing apparatus of claim 1, wherein the protruding top of the dampening cushioning device further comprises multiple nozzles configured to direct extinguishing agent toward and cools the landing non-tubular rocket stage.

6. The non-tubular rocket stage landing apparatus of claim 5, wherein the extinguishing agent comprises at least one of liquid carbon dioxide or a pressurized powder extinguishing agent.

7. The non-tubular rocket stage landing apparatus of claim 1, wherein the platform further comprises wheels configured to move the non-tubular rocket stage landing apparatus to be properly positioned to receive a non-tubular rocket stage on land or on a water floating platform.

8. The non-tubular rocket stage landing apparatus of claim 7, wherein the wheels are motor driven, manually driven or remote driven.

9. A method of using a non-tubular rocket stage landing apparatus for receiving a landing non-tubular rocket stage having a vertical perspective having at least one horizontal non-circular cross section along the vertical length and a downward view showing all non-circular circumference sections within a pass-through non-circular circumference, hereafter called a non-circular pass through circumference and having a point most distant from the center axis of the platform, the method comprising the steps of providing a non-tubular rocket stage landing apparatus comprising a platform, an area, a perimeter, a top, a bottom, and a center, a dampening cushioning device comprising a base not attached to but in rotational communication with the center of the platform, a dampening cushioning region above the base, and a protruding top with a base element attached to the dampening cushioning region and configured to participate in diffusing hot gas from ignited fuel away from the dampening cushioning device and the landing site of the landing non-tubular rocket stage and avoid having the hot gas blowing back to the landing non-tubular rocket stage, an exhaust diffuser device comprising a base having a first diameter, a first inside surface, a first edge in communication with the platform to form multiple openings configured to direct hot gases from ignited fuel from the landing non-tubular rocket stage away from the dampening cushioning device on the platform, the landing site of the landing non-tubular rocket stage, and avoid having the hot gas blowing back to the landing non-tubular rocket stage, a mid-region with a second inside surface and a second diameter attached to the dampening cushioning device and the second inside surface, and an upper section with a third diameter, a third inside surface, and a third edge configured to releasably attach to a base of a landing non-tubular rocket stage, the exhaust diffuser device having, a truncated cone shape with an outer surface and the first diameter is larger than the second diameter that is larger than the third diameter;

a hollow shell configured to vertically pass a non-tubular rocket stage with a noncircular pass-through circumference comprising an overall first shape configured to receive the non-tubular rocket stage, an outer surface, an inner surface, an upper end having an upper opening with a fourth edge with a first noncircular circumference having a second shape at least as large as the non-circular pass through circumference, a lower region with a second circumference having a third shape at least as large as the non-circular pass through circumference and less than the first circumference and configured to expose the third edge of the exhaust diffuser device and a flared bottom with a third circumference and an inside surface between the second circumference and the third circumference that is configured to enclose and be in communication with the outer surface of the exhaust diffuser device to direct ignited fuel to the diffuser top and outward away from the dampening cushioning device and from the landing site of the landing non-tubular stage to avoid blow back and damage to the landing non-tubular stage, and a rotational device configured to be in communication with the hollow shell and the landing non-tubular rocket with the noncircular pass-through circumference and to rotate the hollow shell to align the hollow shell with the landing noncircular rocket with the noncircular pass-through circumference of the rocket, providing a landing nontubular stage a pre-determined target area on earth containing the rocket non-tubular stage landing apparatus, refining the position of the center of the rocket non-tubular stage landing apparatus to be the target of the descending landing non-tubular stage to receive the landing non-tubular stage;

rotating the hollow shell until the first non-circular circumference having a second shape at least as large as the non-circular pass-through circumference aligns with the non-circular pass-through circumference of the descending non-tubular rocket stage, and retrieving the rocket nontubular stage intact to form a retrieved non-tubular rocket stage.

10. The method of using a non-tubular rocket stage landing apparatus of claim 9 further comprising the step of reusing the retrieved non-tubular rocket stage with minimal refurbishing operations.

11. The method of using a non-tubular rocket stage landing apparatus of claim 9, wherein the hollow shell further comprises the step of

16 providing a collection of multiple arms with each arm end rotatably attached to and spaced equally distanced about the first circumference of the hollow shell and configured to rotate upward and outward initially to extend guidance of a landing non-tubular rocket stage above the first circumference, each arm having an end with a curved horizontal tip and configured to rotate inward to encompass a landing non-tubular rocket stage with the adjacent tips intertwining and without touching each other.

12. The method of using a non-tubular rocket stage landing apparatus of claim 9, wherein the dampening cushioning device further comprises multiple openings configured to direct extinguishing agent toward the landing non-tubular rocket stage to extinguish the remaining ignited fuel and to cool it.

13. The method of using a non-tubular rocket stage landing apparatus of claim 9, wherein the platform further comprises wheels configured to move the non-tubular rocket stage landing apparatus to where a descending overhead non-tubular rocket stage on ground or on a water floating platform.

14. The method of using a non-tubular rocket stage landing apparatus of claim 13, wherein the wheels are from a group consisting of motor driven, directional, and manually remote driven.

15. The method of using a non-tubular rocket stage landing apparatus of claim 9, wherein the rotational device comprises a circular ring-shaped base having a bottom, a circular circumference, an outside edge, an outside diameter extending beyond the furthest point on the non-circular pass-through circumference and an inside diameter attached to the outer surface of the hollow shell below the first circumference and above the second circumference, a supporting, positioning, and rotating device in communication with the circular ring-shaped base to position the hollow shell and rotate the hollow shell in a controlled manner, comprising at least three supporting rollers with axes parallel to the platform and attached to the platform, being sat on by the bottom of the ring-shaped base, and spaced equally beneath the ring-shaped base to guide the ring-shaped base in a rotational movement about the center of the platform to maintain the ring in a position centered on the center of the platform, and a motor configured to rotate the ring-shaped base.

* * * * *